(12) United States Patent
Patwardhan et al.

(10) Patent No.: US 10,271,274 B2
(45) Date of Patent: Apr. 23, 2019

(54) DEVICES AND METHODS FOR FACILITATING EXTENDED TIME PERIODS FOR MAINTAINING PPP SESSIONS

(71) Applicant: Qualcomm Incorporated, San Diego, CA (US)

(72) Inventors: Ravindra Manohar Patwardhan, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 13/747,913

(22) Filed: Jan. 23, 2013

(65) Prior Publication Data

US 2013/0203344 A1    Aug. 8, 2013

Related U.S. Application Data

(60) Provisional application No. 61/594,914, filed on Feb. 3, 2012.

(51) Int. Cl.
*H04B 7/24* (2006.01)
*H04W 52/02* (2009.01)
(Continued)

(52) U.S. Cl.
CPC ....... *H04W 52/0206* (2013.01); *H04W 76/25* (2018.02); *H04W 76/38* (2018.02);
(Continued)

(58) Field of Classification Search
CPC ..... H04W 12/04; H04W 12/10; H04W 16/00; H04W 16/06; H04W 36/00;
(Continued)

(56) References Cited

U.S. PATENT DOCUMENTS 6,148,205 A    11/2000  Cotton
7,573,867 B1*  8/2009   Welch ................. H04W 76/25
                                                 370/352
(Continued)

FOREIGN PATENT DOCUMENTS

CN    101026620 A    8/2007
EP      1596616 A1   11/2005
(Continued)

OTHER PUBLICATIONS

3GPP TR 23.888 V1.5.0 (Oct. 2011) 3rd Generation Partnership Project; Technical Specification Group Services and System Aspects; System Improvements for Machine-Type Communications; (Release 11).
(Continued)

*Primary Examiner* — Ajibola A Akinyemi
(74) *Attorney, Agent, or Firm* — Holland & Hart LLP (57) ABSTRACT

Access terminals are adapted to facilitate extended time periods for maintaining PPP sessions. According to one example, an access terminal can communicate with a network entity to establish a PPP session maintained by an extended time period. The extended time frame can be different (e.g., greater or less) than a default time period for maintaining the PPP session. For instance, the access terminal may establish a PPP session including a PPP connection. The access terminal may also send a persistence indicator to the network entity to cause setting the extended time period for maintaining the PPP session. The network entity may receive the persistence indicator and accordingly employ a differing time period (e.g., an extended time period) for maintaining the PPP session. Other aspects, embodiments, and features are also included.

52 Claims, 7 Drawing Sheets

(51) Int. Cl.
*H04W 76/25* (2018.01)
*H04W 76/38* (2018.01)

(52) U.S. Cl.
CPC .......... *Y02D 70/00* (2018.01); *Y02D 70/1226* (2018.01); *Y02D 70/1242* (2018.01); *Y02D 70/1262* (2018.01); *Y02D 70/20* (2018.01); *Y02D 70/21* (2018.01)

(58) Field of Classification Search
CPC . H04W 36/0016; H04W 40/22; H04W 40/24; H04W 40/246; H04W 40/248; H04W 40/32; H04W 48/18; H04W 4/00; H04W 4/06; H04W 4/08
USPC .......................................................... 455/39
See application file for complete search history.

(56) References Cited

U.S. PATENT DOCUMENTS

| | | | |
|---|---|---|---|
| 8,086,748 B2 | 12/2011 | Mir et al. | |
| 8,160,634 B1 | 4/2012 | Vargantwar et al. | |
| 2002/0087659 A1* | 7/2002 | Chapman ................ | H04L 29/06 709/218 |
| 2003/0087649 A1 | 5/2003 | Bhatia et al. | |
| 2004/0266450 A1* | 12/2004 | Chowdhury .......... | H04W 76/25 455/452.2 |
| 2006/0002358 A1 | 1/2006 | Ray et al. | |
| 2006/0002397 A1* | 1/2006 | Xue ................... | H04L 29/12273 370/395.2 |
| 2006/0104301 A1* | 5/2006 | Beyer ................... | H04J 3/0667 370/445 |
| 2007/0230393 A1 | 10/2007 | Sinha et al. | |
| 2008/0107246 A1* | 5/2008 | Burger et al. .............. | 379/88.23 |
| 2009/0003208 A1 | 1/2009 | Payyappilly et al. | |
| 2009/0040988 A1* | 2/2009 | Mir et al. ....................... | 370/338 |
| 2009/0075669 A1 | 3/2009 | Franceschini et al. | |
| 2010/0057485 A1 | 3/2010 | Luft | |
| 2010/0075680 A1 | 3/2010 | Ramachandran et al. | |
| 2011/0128911 A1 | 6/2011 | Shaheen | |
| 2011/0140846 A1 | 6/2011 | Blanz et al. | |
| 2011/0170470 A1 | 7/2011 | Sinnarajah et al. | |
| 2011/0191426 A1 | 8/2011 | Leifer | |
| 2011/0195709 A1 | 8/2011 | Christensson et al. | |
| 2011/0213871 A1 | 9/2011 | Digirolamo et al. | |
| 2011/0294507 A1 | 12/2011 | Takagi | |
| 2012/0004003 A1 | 1/2012 | Shaheen et al. | |
| 2012/0020291 A1 | 1/2012 | Nasielski et al. | |
| 2012/0030358 A1 | 2/2012 | MacKenzie | |
| 2012/0058764 A1 | 3/2012 | Kang et al. | |
| 2012/0117140 A1 | 5/2012 | Wang et al. | |
| 2012/0218889 A1 | 8/2012 | Watfa et al. | |
| 2012/0284385 A1 | 11/2012 | Kavanaugh et al. | |
| 2013/0107803 A1 | 5/2013 | Patwardhan et al. | |
| 2013/0109382 A1 | 5/2013 | Patwardhan et al. | |
| 2014/0282065 A1* | 9/2014 | Grossman et al. ........... | 715/748 |

FOREIGN PATENT DOCUMENTS

| | | |
|---|---|---|
| EP | 1619906 A1 | 1/2006 |
| JP | 2002520962 A | 7/2002 |
| JP | 2005328550 A | 11/2005 |
| WO | 0003554 A1 | 1/2000 |
| WO | 0203719 A2 | 1/2002 |
| WO | 2010036738 A2 | 4/2010 |
| WO | 2011099921 A1 | 8/2011 |

OTHER PUBLICATIONS

Agrawal, P., et al., "Mobility and session management: UMTS vs. cdma2000", IEEE Wireless Communications, IEEE Service Center, Piscataway, NJ, US, vol. 11, No. 4, Aug. 1, 2004 (Aug. 1, 2004), pp. 30-43, XP011117200, ISSN: 1536-1284, DOI: 10.1109/MWC.2004.1325889, pp. 36-37.

Attar, R., et al., "1x enhancements for m2m (Stage 2); C20-20120206-XYZ QCOM; C20-20120206-008_Qualcomm_1x_m2m_stage2_v6", Feb. 5, 2012 (Feb. 5, 2012), pp. 1-50, XP055047709.

Attar R., et al., "Enhancements to CDMA2000 1x for M2M communications", Globecom Workshops (GC WKSHPS), 2012 IEEE, IEEE, Dec. 3, 2012 (Dec. 3, 2012), pp. 1675-1680, XP032341637, DOI: 10.1109/GL0C0MW.2012.6477837 ISBN: 978-14673-4942-0 p. 1679.

He, L., et al., "1xM2M: Stage 3 changes for Joing R-FCH and R-SCH Assignment; C20-20120206-014_Qualcomm_1xM2M_Joint R-FCH_R-SCH_Assignment", Feb. 5, 2012 (Feb. 5, 2012), XP055047747.

He L., et al.,"1 xM2M: Stage 3 changes for Longer Timer Value for Timer-based Registration; C20-20120206-016_Qualcomm_1xM2M_LongerTimerBasedRegistration", Feb. 5, 2012 (Feb. 5, 2012), pp. 1-10, XP055048087, Retrieved from the Internet: URL:http://ftp.3gpp2.org/TSGC/working/2012/2012-02-Nanjing/TSGC-2012-02-Nanjing/WG2/C20-20120206-016_Qualcomm_1 xM2M_LongerTimerBasedRegistration.doc [retrieved on Dec. 17, 2012].

Huawei et al: "Handling of MTC device specific periodic update timers", 3GPP Draft; S2-103506, 3rd Generation Partnership Project (3GPP), Mobile Competence Centre ; 650, Route Des Lucioles ; F-06921 Sophia-Antipolis Cedex ; France, vol. SA WG2, No. Brunstad; 20100903, Aug. 24, 2010 (Aug. 24, 2010), XP050458554, [retrieved on Aug. 24, 2010].

Inbar Anson Bratspiess: "Short Data Burst Support: Editorial Changes; C80216p-11_0269", Sep. 11, 2011 (Sep. 11, 2011), pp. 1-3, XP055047831.

International Search Report and Written Opinion—PCT/US2013/024459—ISA/EPO—dated Apr. 12, 2013.

Jou, Y.C., et al., "M2M over CDMA2000 1x case studies", Wireless Communications and Networking Conference (WCNC), 2011 IEEE, IEEE, Mar. 28, 2011 (Mar. 28, 2011), pp. 1546-1551, XP031876480, DOI: 10.1109/WCNC.2011.5779360 ISBN: 978-1-61284-255-4.

Kalle R.K., et al., "Optimizing Location update for stationary M2M devices ; C80216p-11_0010", IEEE Draft; C80216P-11_0010, IEEE-SA, Piscataway, NJ USA, vol. 802.16p, Mar. 3, 2011 (Mar. 3, 2011), pp. 1-4, XP017614357, [retrieved on Mar. 5, 2011].

Kpn et al: "Key Issue—Offline Small Data Transmissions", 3GPP Draft; S2-100097_0FFLINE Small Data, 3rd Generation Partnership Project (3GPP), Mobile Competence Centre ; 650, Route Des Lucioles ; F-06921 Sophia-Antipolis Cedex ; France, vol. SA WG2, No. Shenzhen; 20100118, Jan. 12, 2010 (Jan. 12, 2010), XP050432725.

Li, H., et al., "M2M Short Message Services in 16m; IEEE C802.16p-11_0164", Jul. 10, 2011 (Jul. 10, 2011), XP055047834.

Park G., et al.,"Location update procedure for 802.16p system ; C80216p-10 0017", IEEE Draft; C80216P-10_0017, IEEE Draft; C80216P-10_0017, IEEE-SA, Piscataway, NJ USA, vol . 802.16p, Dec. 30, 2010 (Dec. 30, 2010), pp. 1-7, XP017617646, [retrieved on Dec. 30, 2010].

"Part 16: Air Interface for Broadband Wireless Access Systems a ; P80216p_D1", IEEE Draft; P80216P_D1, IEEE-SA, Piscataway, NJ USA, vol. 802.16, No. D1, Oct. 8, 2011 (Oct. 8, 2011), pp. 1-43, XP017646970.

Vodafone: "Network operator issues for Machine-To-Machine Type Devices", 3GPP Draft; S2-102614, 3rd Generation Partnership Project (3GPP), Mobile Competence Centre ; 650, Route Des Lucioles ; F-06921 Sophia-Antipolis Cedex ; France, vol. SA WG2, No. Kyoto; May 10, 2010, May 4, 2010 (May 4, 2010), XP050434730, [retrieved on May 4, 2010].

Yeh J.H., et al., "Comparative Analysis of Energy-Saving Techniques in 3GPP and 3GPP2 Systems", IEEE Transactions on Vehicular Technology, IEEE Service Center, Piscataway, NJ, US, vol. 58, No. 1, Jan. 1, 2009 (Jan. 1, 2009), pp. 432-448, XP011226380, ISSN: 0018-9545, DOI: 10.1109/TVT.2008.923687, p. 440.

3GPP 23.060 V5.10.0, "3rd Generation Partnership Project; Technical Specification Group Services and System Aspects; General Packet Radio Service (GPRS); Service Description; Stage 2 (Release 5)", Mar. 2005.

* cited by examiner

DEVICES AND METHODS FOR FACILITATING EXTENDED TIME PERIODS FOR MAINTAINING PPP SESSIONS

PRIORITY CLAIM

The present Application for Patent claims priority to Provisional Application No. 61/594,914 entitled "Apparatus and Method of Persistent PPP" filed Feb. 3, 2012, and assigned to the assignee hereof and hereby expressly incorporated by reference herein as if fully set forth below and for all applicable purposes.

TECHNICAL FIELD

The technology discussed in this patent application relates generally to wireless communications, and more specifically, to methods and devices for facilitating extended time periods for maintaining point-to-point protocol ("PPP") sessions in a wireless communications system. Embodiments of the present invention can be used to enable and provide efficient use of power resources in a manner to conserve energy.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems (e.g., cdma2000 1× (IS-2000)), time division multiple access (TDMA) systems, frequency division multiple access (FDMA) systems, 3GPP Long Term Evolution (LTE) systems, and orthogonal frequency division multiple access (OFDMA) systems.

A variety of devices are adapted to utilize such wireless communications systems. Such devices may be generally referred to as access terminals. Some access terminals may be stationary, or at least substantially stationary, such as access terminals adapted for machine-to-machine (M2M) communications (also sometimes referred to as machine-type communication or MTC). An M2M adapted access terminal may include an access terminal that is adapted to operate at least substantially without user interaction. Such M2M adapted access terminals may operate on a limited power source, such as a battery.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some instances, features which may conserve power and assist in extending the operating life of an access terminal's limited power source can be beneficial. Various features and aspects of the present disclosure are adapted to facilitate power conservation in access terminal by facilitating extended time periods for maintaining PPP sessions. By using power in an efficient manner, embodiments of the present invention can operate long term without requiring replenishment of a limited power source as well as ensuring power conservation efforts.

According to at least one aspect of the disclosure, access terminals may include a communications interface and a storage medium coupled with a processing circuit. The processing circuit may be adapted to communicate via the communications interface to establish a Point-to-Point Protocol (PPP) session maintained by an extended time period greater than a default time period for maintaining the PPP session.

Further aspects provide methods operational on access terminals and/or access terminals including means to perform such methods. One or more examples of such methods may include establishing a Point-to-Point Protocol (PPP) session including a PPP connection. A persistence indicator may be sent to cause setting of an extended time period for maintaining the PPP session, wherein the extended time period is greater than a typical time period for maintaining the PPP session.

Still further aspects include computer-readable storage mediums comprising programming operational on a computer, such as an access terminal. According to one or more examples, such programming may be adapted for causing a computer to establish a Point-to-Point Protocol (PPP) session. The programming may be further adapted for causing a computer to transmit a persistence indicator to cause setting of an extended time period for maintaining the PPP session, wherein the extended time period is substantially greater than a typical time period for maintaining the PPP session.

Additional aspects of the present disclosure provide network entities, which may include a communications interface and a storage medium coupled with a processing circuit. The processing circuit may be adapted to receive, via the communications interface, a persistence indicator adapted to cause setting an extended time period for maintaining a Point-to-Point Protocol (PPP) session, where the extended time period is greater than a default time period for maintaining a PPP session. The processing circuit may be further adapted to communicate via the communications interface to establish a PPP session maintained by the extended time period.

Yet further aspects provide methods operational on network entities and/or network entities including means to perform such methods. One or more examples of such methods may include receiving a persistence indicator adapted to cause setting an extended time period for maintaining a Point-to-Point Protocol (PPP) session, where the extended time period is greater than a typical time period for maintaining a PPP session. A PPP session may be established including a PPP connection maintained according to the extended time period.

At least one additional aspect of the present disclosure includes computer-readable storage mediums comprising programming operational on a computer, such as a network entity. According to one or more examples, such programming may be adapted for causing a computer to receive a persistence indicator adapted to cause setting an extended time period for maintaining a Point-to-Point Protocol (PPP) session, where the extended time period is greater than a typical time period for maintaining a PPP session. The programming may be further adapted for causing a computer to establish a PPP session including a PPP connection maintained according to the extended time period.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for code division multiple access (CDMA) systems (e.g., cdma2000 1x (IS-2000), Evolution-Data Optimized, Evolution-Data only (EV-DO)) protocols and systems, and related terminology may be found in much of the following description. However, those of ordinary skill in the art will recognize that one or more aspects of the present disclosure may be employed and included in one or more other wireless communication protocols and systems.

Figure 1:
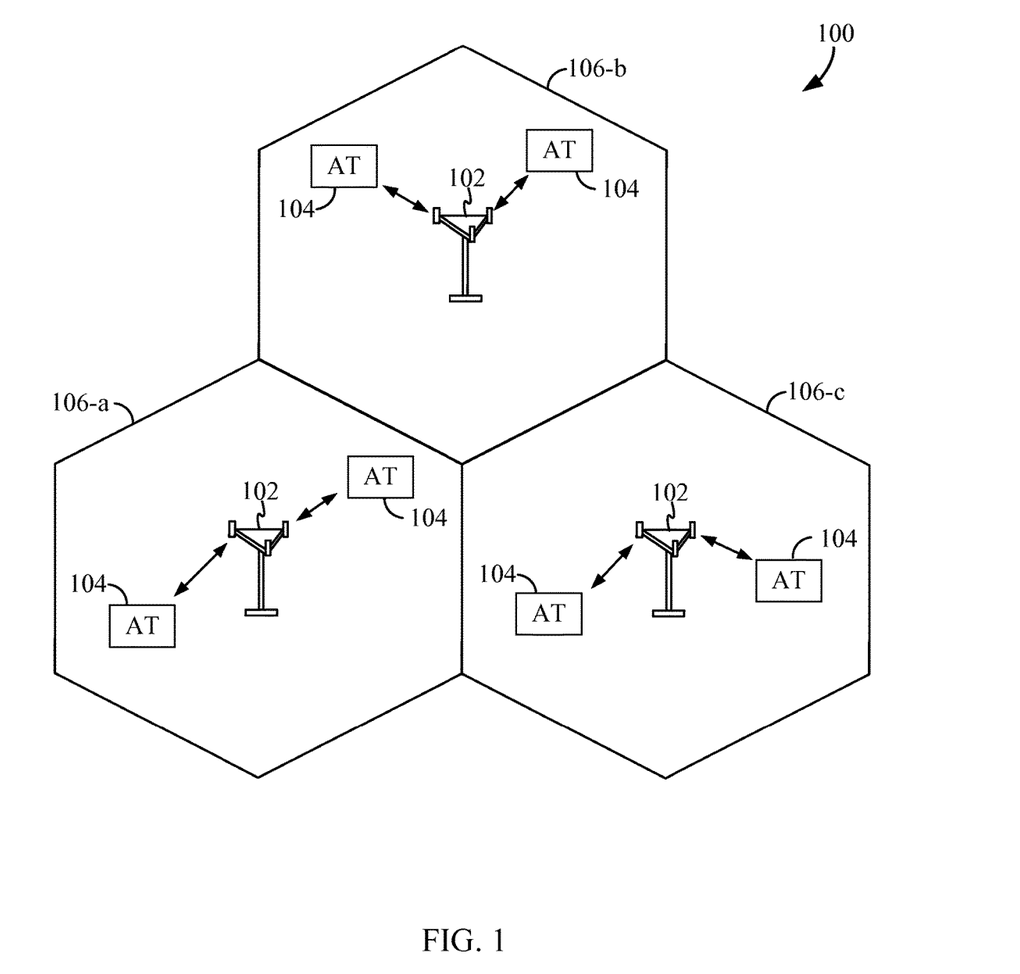
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
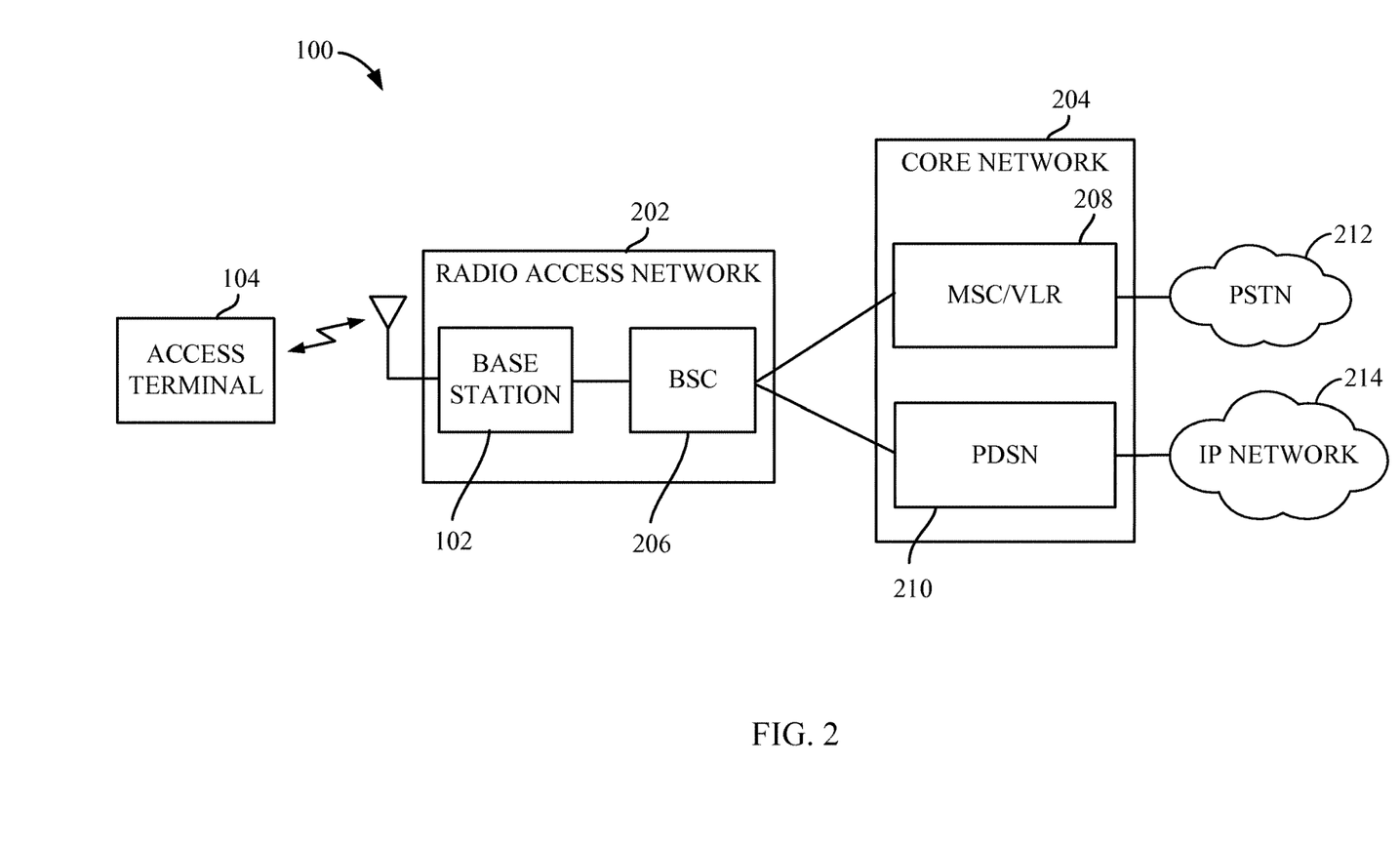
FIG. 2 is a block diagram illustrating select components of the wireless communication system of FIG. 1 according to some embodiments.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-*a*, 106-*b*, or 106-*c*. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), an entertainment device, a sensor or meter, a computing device, a machine-to-machine (M2M) device, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a mobile switching center (MSC) and visitor location register (VLR), identified as MSC/VLR 208, as well as a Packet Data Service Node (PDSN) 210. Other network entities may also be included. An access terminal 104 can obtain access to a public switched telephone network (PSTN) 212 via the MSC/VLR 208, and to an IP network 214 via the PDSN 210.

As an access terminal 104 operates within a wireless communications system 100, the access terminal 104 may employ a Point-to-Point Protocol (PPP) session for communicating over a data link that provides a direct connection between the access terminal 104 and a network entity, such as the PDSN 210. In at least one example, the PDSN 210 may facilitate point-to-point protocol (PPP) communication between the access terminal 104 and a server within the IP network 214. The Point-to-Point Protocol (PPP) specifies a method for transporting multi-protocol datagrams over point-to-point links, and is described in detail in Request for Comments 1661 (RFC 1661), entitled "THE POINT-TO-POINT PROTOCOL (PPP)," published July 1994.

The wireless communications system 100 typically maintains a PPP session for only a limited amount of time, based on communication activity, in order to preserve or reduce the usage of network resources. In some instances, an access terminal 104 may consistently communicate at relatively infrequent intervals. For example, an access terminal 104 may communicate at intervals greater than the amount of time the wireless communications system 100 maintains the PPP session. In such instances, the access terminal 104 may need to establish a new PPP session each time it communicates, as the previous PPP session may have been taken down due to inactivity. The establishment of a new PPP session, however, can be relatively power intensive. When an access terminal 104 has a limited power source, e.g. a battery, the power consumed to setup the PPP session may significantly reduce the operating life of that limited power source.

One example of an access terminal 104 that communicates over a wireless communications system 100 relatively infrequently may include machine-to-machine (M2M) enabled access terminals 104. M2M enabled access terminals 104 are adapted to wirelessly communicate with one or more devices over a wireless communications system 100, at least substantially without user interaction. M2M access terminals 104 may be a communications device adapted to capture an event (e.g., a sensor that captures temperature, a meter to capture inventory level, etc.), which is relayed through the wireless communication system 100 (e.g., via a PPP connection) to an application (e.g., an M2M server in the IP network 214), where the event data can be translated into meaningful information (e.g., temperature needs to be lowered/raised, items need to be restocked, etc.). By way of example and not limitation, an M2M access terminal 104 may include a thermostat, a water meter, a sprinkler system, a smart-meter, an appliance, etc.

According to one or more aspects of the present disclosure, access terminals 104 and network entities (e.g., base station 102, PDSN 210, etc.) are adapted to improve management of Point-to-Point Protocol (PPP) sessions for access terminals operating within a wireless communications system. For example, access terminals and network entities of the present disclosure may be adapted to employ a persistence mechanism for employing an extended time period for maintaining the PPP session.

Figure 3:
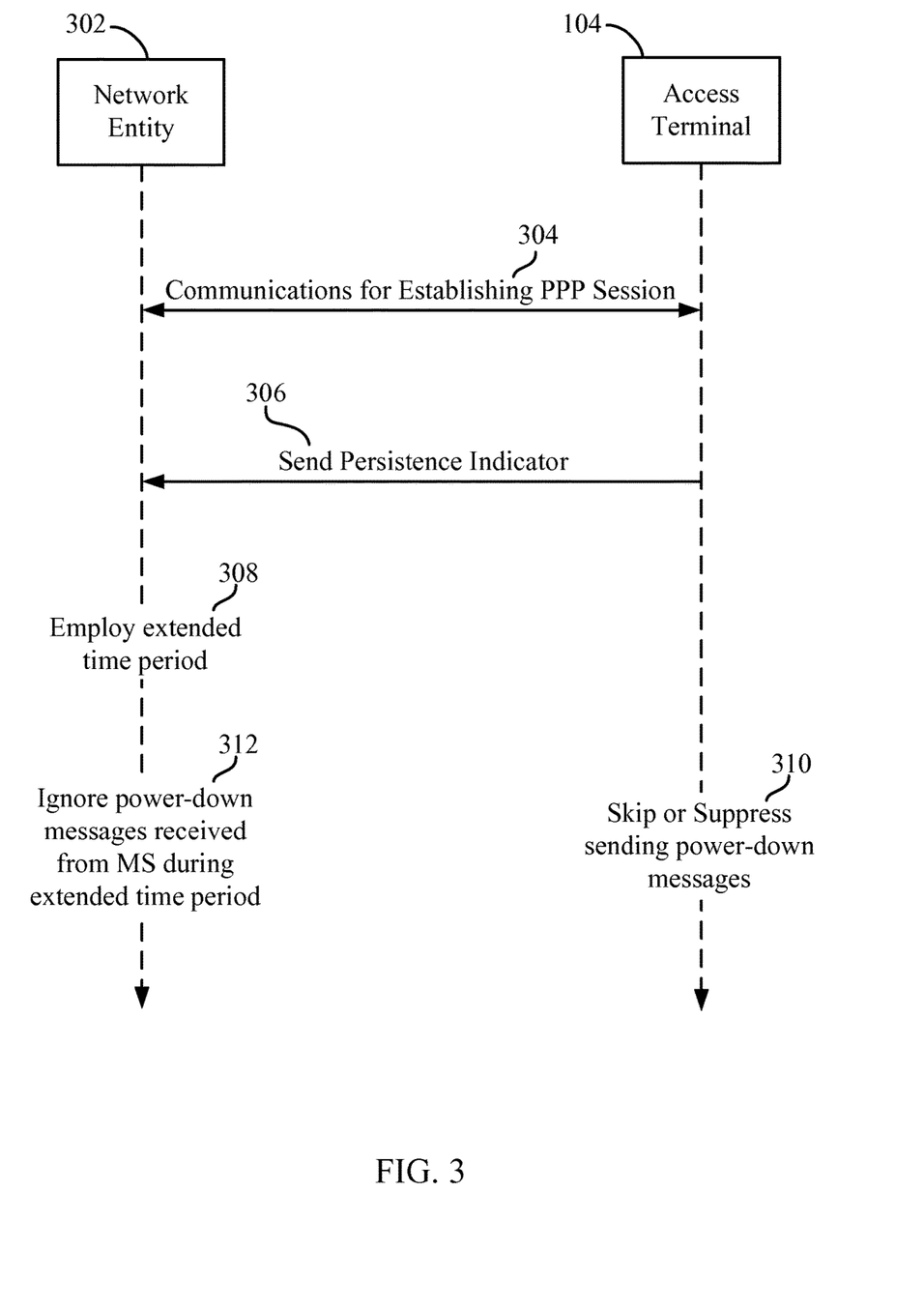
FIG. 3 is a flow diagram illustrating an example for employing an extended time period for maintaining a PPP session according to some embodiments.

FIG. 3 is a flow diagram illustrating an example for employing an extended time period for maintaining a PPP session. In this example, the access terminal 104 can communicate with one or more network entities 302 to receive wireless network access. By way of example and not limitation, the network entity 302 may include one or more of any type of network components, such as a base station (e.g., base station 102 in FIGS. 1 & 2), a packet data service node (e.g., PDSN 210 in FIG. 2), a base station controller (e.g., BSC 206 in FIG. 2), and/or other network component that can enable the access terminal 104 to communicate and/or that can establish and maintain a PPP session.

As illustrated, the access terminal 104 and the network entity 302 may communicate to establish a PPP session 304. The PPP session established at 304 may facilitate a PPP connection for the access terminal 104 to a server within an IP network (e.g., IP network 214 in FIG. 2). In some instances, the PPP session establishment may be initiated by the access terminal 104, while in other instances the PPP session establishment may be initiated by the network entity 302. The PPP establishment procedure includes establishing a data link and authentication of the access terminal 104, and results in creation of a PPP session, including a PPP connection for sending data packets between the access terminal 104 and another entity, such as a server. The PPP session may include various parameters governing the PPP connection, such as Quality of Service (QoS) parameters and a time period for maintaining the PPP session.

At some point in time, the access terminal 104 may convey a persistence indicator 306 to the network entity 302. The persistence indicator 306 can be adapted to cause an extended time period to be set for maintaining the PPP session. In the illustrated example, the persistence indicator is illustrated as being conveyed after the communications are initiated for establishing the PPP session. In other examples, the persistence indicator 306 may be conveyed at the same time as communications for establishing a PPP session, or at another time (e.g., at a time prior) to establishing a PPP session.

The extended time period is configured to be greater than a conventional or default time period typically employed by the wireless communications system for maintaining PPP sessions. By way of example only, the extended time period may be eight (8) hours, twelve (12) hours, twenty-four (24) hours, or some other time period. In some instances, the extended time period may be a time period negotiated between the access terminal 104 and the network entity 302. In some instances, the persistence indicator may include an always-on indicator that requests or causes setting of the extended time period as an infinite time period or until further notice.

The persistence indicator may be an explicit indicator. For example, it can be an explicit command to implement the extended time period, or an explicit request for the extended time period. In other examples, the persistence indicator may be an implicit indicator, such as an access terminal identifier or other unique identifier corresponding to the access terminal 104, where the implicit indicator may be used by the network entity 302 to determine whether to employ an extended time period and/or to confirm that the access terminal 104 is a device that is approved for an extended time period. For instance, an access terminal identifier or other unique identifier corresponding to the access terminal 104 may include, but is not limited to, identifiers such as an International Mobile Subscriber Identifier (IMSI) or a network access identifier (NAI). In such instances, the network entity 302 may employ the identifier to determine that an extended time period is to be employed for PPP sessions associated with the access terminal 104.

In response to the persistence indicator, an extended time period 308 can be employed for one or more PPP sessions associated with the access terminal 104. In conventional communications systems, the network is typically adapted to remove a PPP session if a power-down registration is received from an access terminal. In some examples of the present disclosure, when the extended time period is employed in response to the persistence indicator, the access terminal 104 may be adapted to skip or suppress 310 sending a power-down registration to the network entity 302 for the duration of the extended time period. In the alternative, or in addition, the network entity 302 can be adapted to ignore 312 any power-down registration messages received from the access terminal 104 during the extended time period, at least with regards to the PPP session. In other words, the network entity 302 may still process a received power-down registration message to stop paging the access terminal 104 and/or other conventional responses to a power-down registration message, except that the network entity 302 can be adapted to not tear down the PPP session in response to the registration power-down registration message.

Figure 4:
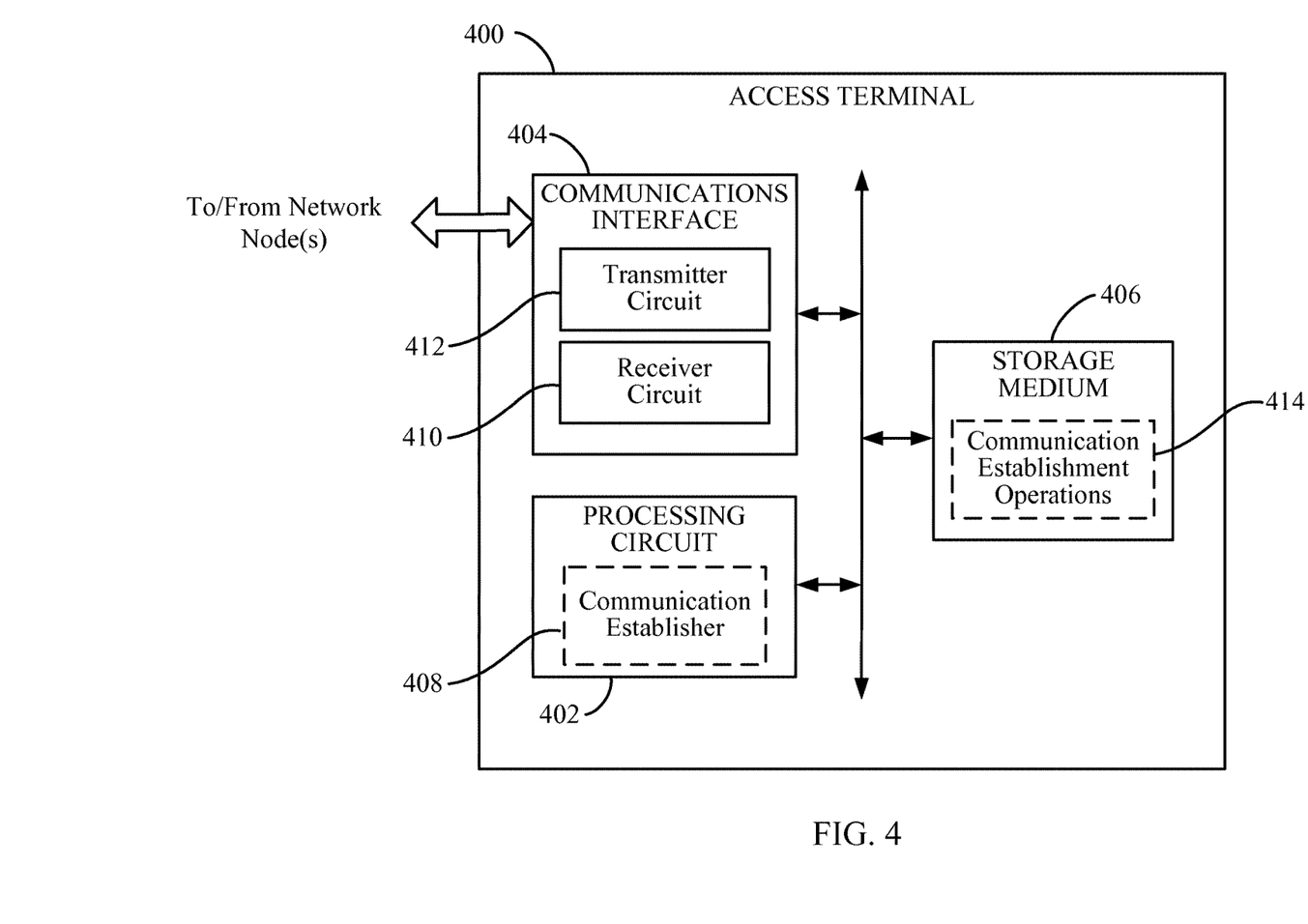
FIG. 4 is a block diagram illustrating select components of an access terminal according to some embodiments.

Turning to FIG. 4, a block diagram is shown illustrating select components of an access terminal 400 according to at least one example of the present disclosure. The access terminal 400 includes a processing circuit 402 coupled to or placed in electrical communication with a communications interface 404 and a storage medium 406. Additional or different components may be included according to varying embodiments.

The processing circuit 402 is arranged to obtain, process and/or send data, control data access and storage, issue commands, and control other desired operations. The processing circuit 402 may include circuitry adapted to implement desired programming provided by appropriate media in at least one example. For example, the processing circuit 402 may be implemented as one or more processors, one or more controllers, and/or other structure configured to execute executable programming. Examples of the processing circuit 402 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 402 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 402 are for illustration and other suitable configurations within the scope of the present disclosure are also contemplated.

The processing circuit 402 is adapted for processing, including the execution of programming, which may be stored on the storage medium 406. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 402 may include a communication establisher 408, which may include a PPP establishment module and/or a persistence requestor module. The communication establisher 408 may include circuitry and/or programming (e.g., communication establishment operations 414 stored on the storage medium 406) adapted to establish a PPP session maintained by an extended time period. In at least one example, the communication establisher 408 and the communication establishment operations 414 stored on the storage medium 406 may collectively be referred to as a communication establishment component.

The communications interface 404, which may also be referred to as a communications component, is configured to facilitate wireless communications of the access terminal 400. For example, the communications interface 404 may include circuitry and/or programming adapted for establishing and maintaining communications with one or more wireless network devices (e.g., network entities). The communications interface 404 may be coupled to one or more antennas (not shown), and includes wireless transceiver circuitry, including at least one receiver circuit 410 (e.g., one or more receiver chains) and/or at least one transmitter circuit 412 (e.g., one or more transmitter chains).

The storage medium 406 may represent one or more computer-readable, machine-readable, and/or processor-readable devices for storing programming, such as processor executable code or instructions (e.g., software, firmware), electronic data, databases, or other digital information. The storage medium 406 may also be used for storing data that is manipulated by the processing circuit 402 when executing programming. The storage medium 406 may be any available media that can be accessed by a general purpose or special purpose processor, including portable or fixed storage devices, optical storage devices, and various other mediums capable of storing, containing and/or carrying programming. By way of example and not limitation, the storage medium 406 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 406 may be coupled to the processing circuit 402 such that the processing circuit 402 can read information from, and write information to, the storage medium 406. That is, the storage medium 406 can be coupled to the processing circuit 402 so that the storage medium 406 is at least accessible by the processing circuit 402, including examples where the storage medium 406 is integral to the processing circuit 402 and/or examples where the storage medium 406 is separate from the processing circuit 402 (e.g., resident in the access terminal 400, external to the access terminal 400, distributed across multiple entities).

Programming stored by the storage medium 406, when executed by the processing circuit 402, causes the processing circuit 402 to perform one or more of the various functions and/or process steps described herein. For example, the storage medium 406 may include communication establishment operations 414, which may include PPP establishment operations and/or persistent request operations. The communication establishment operations 414 are adapted to cause the processing circuit 402 (e.g., the communication establisher 408) to establish and maintain the configuration and parameters of PPP sessions and PPP connections, and facilitate employment of an extended time period for PPP sessions, as described herein. Thus, according to one or more aspects of the present disclosure, the processing circuit 402 is adapted to perform (in conjunction with the storage medium 406) any or all of the processes, functions, steps and/or routines for any or all of the access terminals described herein (e.g., access terminal 104, access terminal 400). As used herein, the term "adapted" in relation to the processing circuit 402 may refer to the processing circuit 402 being one or more of configured, employed, implemented, and/or programmed (in conjunction with the storage medium 406) to perform a particular process, function, step and/or routine according to various features described herein.

Figure 5:
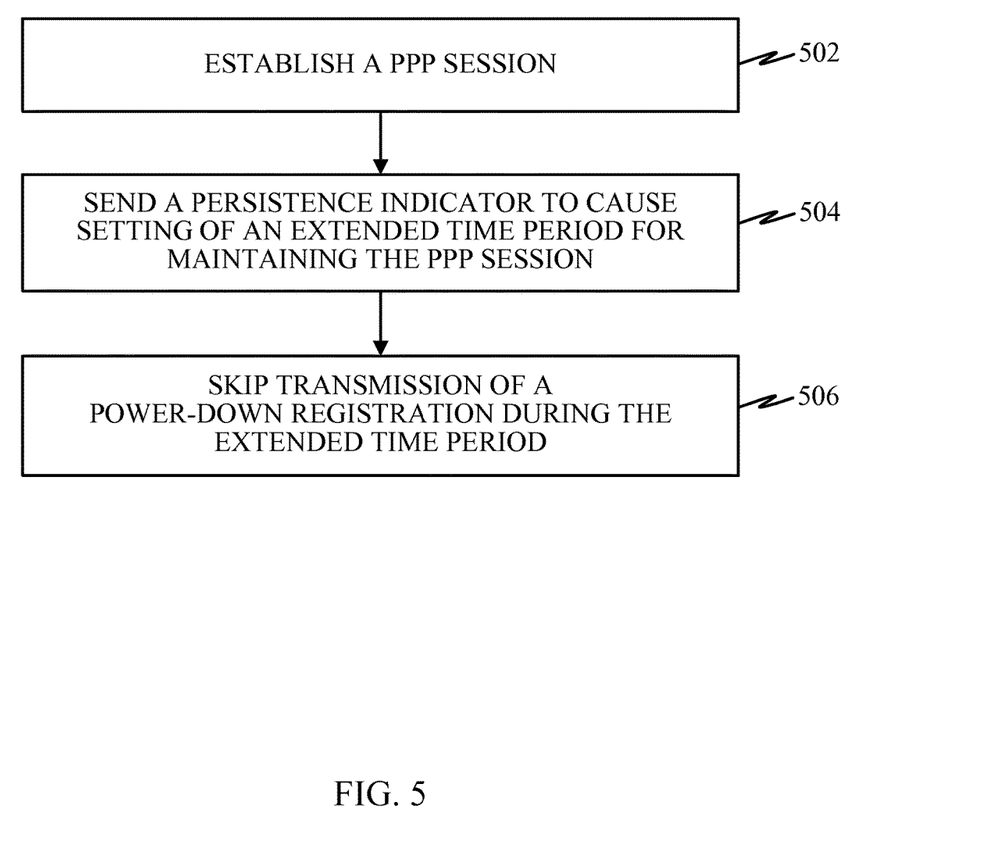
FIG. 5 is a flow diagram illustrating a method operational on an access terminal according to some embodiments.

FIG. 5 is a flow diagram illustrating at least one example of a method operational on an access terminal, such as the access terminal 400. Referring to FIGS. 4 and 5, an access terminal 400 can establish a PPP session at step 502. For example, the processing circuit 402 (e.g., the communication establisher 408) executing the communication establishment operations 414 may communicate with one or more network entities to establish a PPP session including a PPP connection. The PPP session establishment may be initiated by the access terminal 400, or the PPP session establishment may be initiated by one or more network entities. The PPP establishment procedure may include establishing a data link and authentication of the access terminal 400, and may result in creation of a PPP session including a PPP connection for communicating data between the access terminal 400 and another entity, such as a server.

At step 504, the access terminal 400 may send a persistence indicator to cause setting of an extended time period for maintaining the PPP session. For example, the processing circuit 402 (e.g., the communication establisher 408) executing the communication establishment operations 414 may transmit the persistence indicator via the communications interface 404. In some examples, the access terminal 400 may send the persistence indicator before communications are initiated for establishing the PPP session. In other examples, the access terminal 400 may send the persistence indicator at the same time as the communications for establishing a PPP session. In still other examples, the access terminal 400 may send the persistence indicator after the communications are completed for establishing the PPP session.

The extended time period is a period of time greater than the default time period typically employed for maintaining PPP sessions within the respective wireless communications system. In some instances, the access terminal 400 may negotiate the duration of the extended time period. For example, the processing circuit 402 (e.g., the communication establisher 408) executing the communication establishment operations 414 may communicate via the communications interface 404 with one or more network entities to negotiate the duration of the extended time period. In some instances, the persistence indicator may include an always-on indicator that requests or causes setting of the extended time period as an infinite time period until further notice. In some examples, when the access terminal 400 is adapted to communicate over the PPP connection at relatively consistent intervals (e.g., every twenty-four (24) hours), the extended time period may be set to a duration that is longer than the communication interval. In this way, the PPP session will be refreshed each time a communication is sent by the access terminal 400, and the PPP session may continue indefinitely, even though the PPP communications are relatively infrequent.

In at least some examples, the persistence indicator may be an explicit indicator. An explicit indicator may be a message transmitted by the access terminal 400 and adapted to explicitly command the implementation of the extended time period, or to explicitly request the extended time period be implemented. In some instances, the explicit indicator may initiate a negotiation between the access terminal 400 and one or more network entities to determine the duration of the extended time period.

In one or more other examples, the persistence indicator may be an implicit indicator. An implicit indicator may include information typically associated with other purposes, but which is adapted to indicate to one or more network entities that the access terminal 400 can and/or should use an extended time period. For example, an implicit indicator may include an access terminal identifier or other unique identifier corresponding to the access terminal 400 (e.g., International Mobile Subscriber Identifier (IMSI), a network access identifier (NAI)). Such an implicit identifier may be associated with information associated with the device and obtained from the network, such as information obtained from an authentication, authorization and accounting (AAA) server.

In conventional wireless communications systems, an access terminal typically sends a power-down message (e.g., a power-down registration) to inform the system that the access terminal is entering a low powered state. In some instances, when an extended time period is employed for maintaining a PPP session, the access terminal 400 may skip transmission of a power-down registration during the extended time period. That is, the processing circuit 402 (e.g., the communication establisher 408) executing the communication establishment operations 414 may not send a power-down registration message during the extended time period. The access terminal 400 can accordingly power down without the PPP session being torn down. As long as the access terminal 400 communicates on the PPP connection before the extended time period has expired, the PPP session will be refreshed and the extended time period reset.

Figure 6:
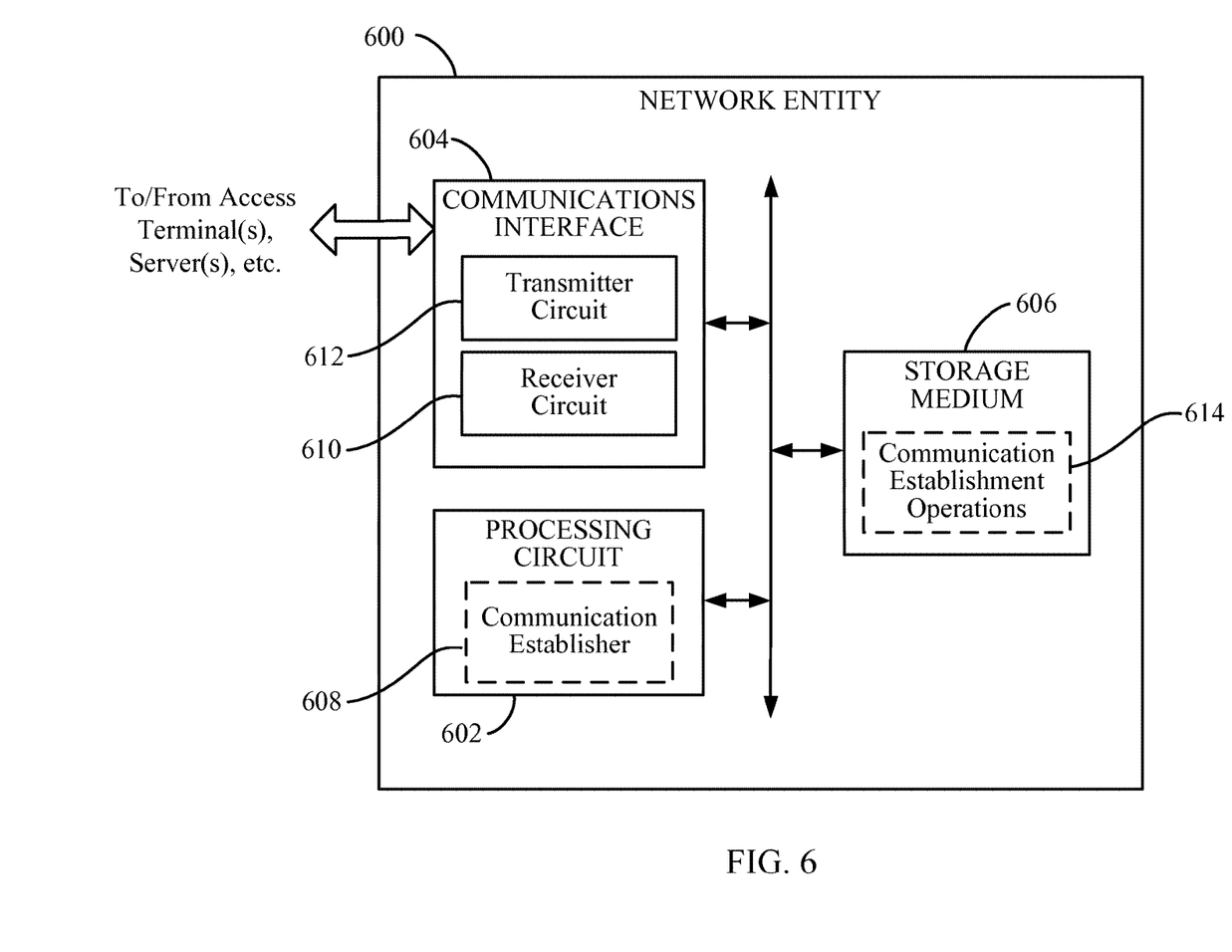
FIG. 6 is a block diagram illustrating select components of a network entity according to some embodiments.

Turning to FIG. 6, a block diagram is shown illustrating select components of a network entity 600 according to at least one example. The network entity 600 may include a processing circuit 602 coupled to or placed in electrical communication with a communications interface 604 and a storage medium 606. Additional or different components may be included according to varying embodiments.

The processing circuit 602 is arranged to obtain, process and/or send data, control data access and storage, issue commands, and control other desired operations. The processing circuit 602 may include circuitry configured to implement desired programming provided by appropriate media in at least one example, and may, by way of example only, be implemented and/or adapted according to any of the examples of the processing circuit 402 described above. In some instances, the processing circuit 602 may include a communication establisher 608, which may include a PPP establishment module and/or a persistence manager module. The communication establisher 608 may include circuitry and/or programming (e.g., communication establishment operations 614 stored on the storage medium 606) adapted to establish and manage a PPP session maintained by an extended time period. In at least one example, the communication establisher 608 and the communication establishment operations 614 stored on the storage medium 606 may collectively be referred to as a communication establishment component.

The communications interface 604, which may also be referred to as a communications component, is configured to facilitate wireless communications of the network entity 600. For example, the communications interface 604 may include circuitry and/or programming adapted to establish and maintain communications with one or more access terminals, servers, and/or other network components. The communications interface 604 may be coupled to one or more antennas (not shown), and includes wireless transceiver circuitry, including at least one receiver circuit 608 (e.g., one or more receiver chains) and/or at least one transmitter circuit 610 (e.g., one or more transmitter chains).

The storage medium 606 may represent one or more computer-readable, machine-readable, and/or processor-readable devices for storing programming, such as processor executable code or instructions (e.g., software, firmware), electronic data, databases, or other digital information. The storage medium 606 may, by way of example only, be configured and/or implemented in a manner similar to the storage medium 406 described above.

The storage medium 606 may be coupled to the processing circuit 602 such that the processing circuit 602 can read information from, and write information to, the storage medium 606. That is, the storage medium 606 can be coupled to the processing circuit 602 so that the storage medium 606 is at least accessible by the processing circuit 602, including examples where the storage medium 606 is integral to the processing circuit 602 and/or examples where the storage medium 606 is separate from the processing circuit 602 (e.g., resident in the network entity 600, external to the network entity 600, distributed across multiple entities).

Like the storage medium 406, the storage medium 606 includes programming stored thereon. The programming stored by the storage medium 606, when executed by the processing circuit 602, causes the processing circuit 602 to perform one or more of the various functions and/or process steps described herein. For example, the storage medium 606 may include communication establishment operations 614, which may include PPP establishment operations and/or persistence management operations. The communication establishment operations 614 can be adapted to cause the processing circuit 602 (e.g., the communication establisher 408) to establish and maintain the configuration and parameters of PPP sessions and PPP connections, and facilitate employment of an extended time period for PPP sessions with an access terminal, as described herein. Thus, according to one or more aspects of the present disclosure, the processing circuit 602 is adapted to perform (in conjunction with the storage medium 606) any or all of the processes, functions, steps and/or routines for any or all of the network entities described herein (e.g., base station 102, base station controller 206, PDSN 210, and/or network entity 302 in FIGS. 1-3). As used herein, the term "adapted" in relation to the processing circuit 602 may refer to the processing circuit 602 being one or more of configured, employed, implemented, and/or programmed (in conjunction with the storage medium 606) to perform a particular process, function, step and/or routine according to various features described herein.

Figure 7:
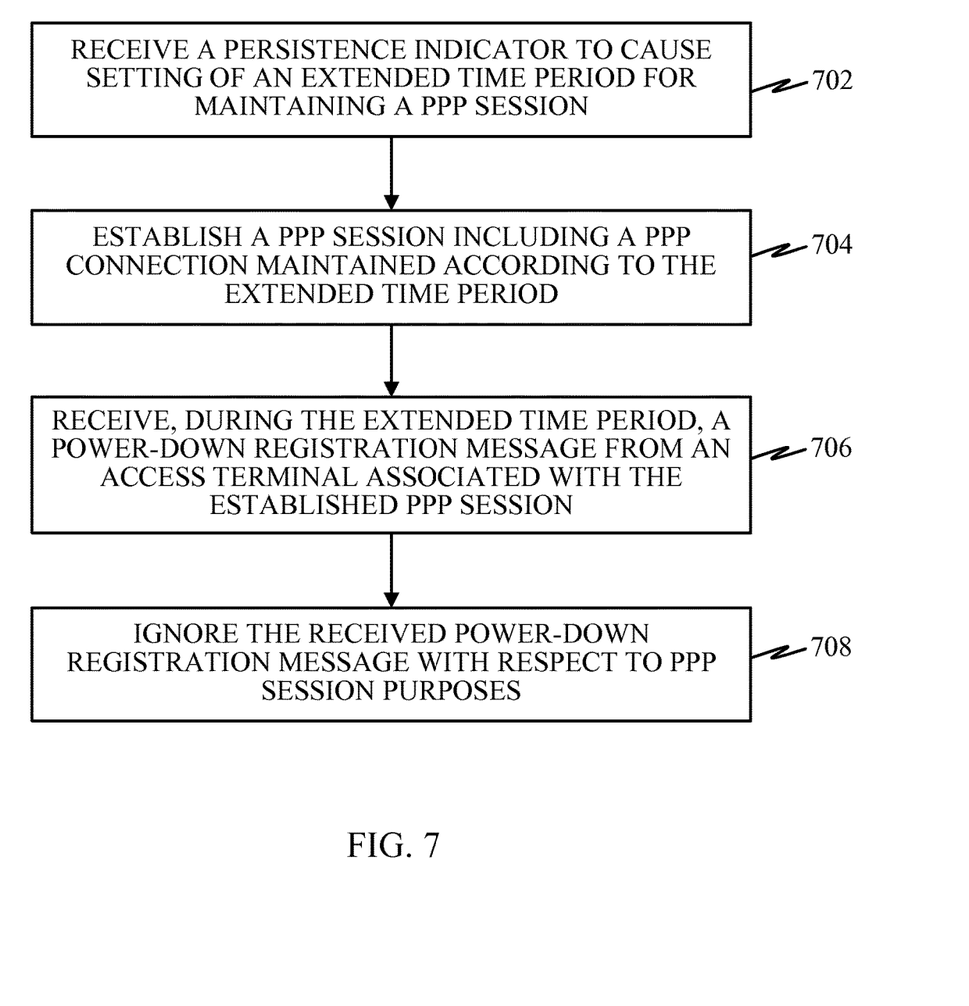
FIG. 7 is a flow diagram illustrating a method operational on a network entity according to some embodiments.

FIG. 7 is a flow diagram illustrating at least one example of a method operational on a network entity, such as the network entity 600. Referring to FIGS. 6 and 7, a network entity 600 may receive a persistence indicator adapted to cause setting of an extended time period for maintaining a PPP session at step 702. For example, the processing circuit 602 (e.g., the communication establisher 608) executing the communication establishment operations 614 may receive a persistence indicator via the communications interface 604. In some examples, the network entity 600 may receive the persistence indicator before communications are initiated for establishing a PPP session. In other examples, the network entity 600 may receive the persistence indicator at the same time as the communications occur for establishing a PPP session. In still other examples, the network entity 600 may send the persistence indicator after the communications are completed for establishing the PPP session.

As discussed herein above, the extended time period is a period of time greater than the default time period typically employed for maintaining PPP sessions within the respective wireless communications system. In some instances, the network entity 600 may negotiate the duration of the extended time period. For example, the processing circuit 602 (e.g., the communication establisher 608) executing the communication establishment operations 614 may communicate via the communications interface 604 with an access terminal to negotiate the duration of the extended time period. In some instances, the persistence indicator may include an always-on indicator that requests or causes setting of the extended time period as an infinite time period until further notice.

As also discussed above, the persistence indicator may be an explicit indicator or an implicit indicator. In at least one example where the persistence indicator is an implicit indicator, the network entity 600 may determine that an access terminal can and/or should use an extended time period from information obtained from the wireless communications system. By way of example only, the network entity 600 may obtain such information associated with the access terminal from an authentication, authorization and accounting (AAA) server.

As step 704, the network entity 600 may establish a PPP session including a PPP connection maintained according to the extended time period. For example, the processing circuit 602 (e.g., the communication establisher 608) executing the communication establishment operations 614 may communication with the respective access terminal via the communications interface 604 to establish a PPP session, where the PPP connection is maintained according to the extended time period. The PPP session establishment may be initiated by the network entity 600, or the PPP session establishment may be initiated by the respective access terminal. The PPP establishment procedure may include establishing a data link and authenticating the access terminal, resulting in creation of a PPP session with a PPP connection for communicating data between the access terminal and a server.

Typically, when an access terminal is powering down, a power-down registration message is sent by the respective access terminal to the network. In conventional wireless communications systems, any PPP sessions associated with that access terminal are typically taken down. According to at least one optional feature, the network entity 600 can ignore such power-down registration messages with respect to any associated PPP sessions for the duration of an extended time period. For instance, the network entity 600 may receive, during the extended time period, a power-down registration message from the access terminal associated with the established PPP session at step 706. In at least one example, the processing circuit 602 (e.g., the communication establisher 608) executing the communication establishment operations 614 may receive the power-down registration message via the communications interface 604.

When the power-down registration message is received during the extended time period, the network entity 600 can ignore the received message for PPP session purposes at step 708. For example, the processing circuit 602 (e.g., the communication establisher 608) executing the communication establishment operations 614 may determine that the power-down registration message is received during the extended time period. In response to this determination, the processing circuit 602 (e.g., the communication establisher 608) executing the communication establishment operations 614 can ignore the received power-down registration message for PPP session purposes. In other words, the network entity 600 can avoid tearing down the PPP session associated with the access terminal from which the power-down registration message is received. The network entity 600 may, however, still perform other conventional procedures in response to such a power-down registration message, such as stopping the transmission of page messages for the respective access terminal as well as other conventional procedures in response to the received power-down registration message.

While the above discussed aspects, arrangements, and embodiments are discussed with specific details and particularity, one or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 3, 4 and/or 6 may be configured to perform or employ one or more of the methods, features, parameters, and/or steps described in FIGS. 3, 5 and/or 7. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
a communications interface;
a storage medium; and
a processing circuit coupled to the communications interface and the storage medium, the processing circuit adapted to
communicate via the communications interface to establish a Point-to-Point protocol (PPP) session including a PPP connection, wherein the PPP session is associated with a default time period for maintaining the PPP session during communication inactivity;
send via the communications interface an indicator to configure an extended time period greater than the default time period for maintaining the PPP session, wherein the PPP session is associated with the extended time period for maintaining the PPP session during communication inactivity intervals greater than the default time period and less than the extended time period after sending the indicator; and
communicate, after sending the indicator and without re-establishing the PPP session, over the PPP connection via the communications interface after a communication inactivity interval greater than the default time period and less than the extended time period based at least in part on sending the indicator to configure the extended time period.

2. The access terminal of claim 1, wherein the indicator comprises an implicit persistence indicator.

3. The access terminal of claim 1, wherein the indicator comprises an explicit persistence indicator.

4. The access terminal of claim 1, wherein the indicator comprises an always-on indicator.

5. The access terminal of claim 1, wherein the processing circuit is further adapted to:
enter a low powered state; and skip transmission of a power-down registration during the extended time period.

6. The access terminal of claim 1, wherein the processing circuit is further adapted to:
negotiate a duration of the extended time period.

7. A method operational on an access terminal, comprising:
establishing a Point-to-Point Protocol (PPP) session including a PPP connection, wherein the PPP session is associated with a default time period for maintaining the PPP session during communication inactivity;
sending an indicator to configure an extended time period for maintaining the PPP session, wherein the extended time period is greater than the default time period for maintaining the PPP session, wherein the PPP session is associated with the extended time period for maintaining the PPP session during communication inactivity intervals greater than the default time period and less than the extended time period after sending the indicator; and
communicate, after sending the indicator and without re-establishing the PPP session, over the PPP connection after a communication inactivity interval greater than the default time period and less than the extended time period based at least in part on sending the indicator to configure the extended time period.

8. The method of claim 7, wherein sending the indicator comprises:
sending the indicator prior to establishing the PPP session.

9. The method of claim 7, wherein sending the indicator comprises:
sending the indicator during the establishment of the PPP session.

10. The method of claim 7, wherein sending the indicator comprises:
sending an explicit indicator.

11. The method of claim 7, wherein sending the indicator comprises:
sending an implicit indicator.

12. The method of claim 7, further comprising:
entering a low powered state; and
skipping transmission of a power down registration during the extended time period.

13. The method of claim 7, further comprising:
negotiating a duration for the extended time period.

14. An access terminal, comprising:
means for establishing a Point-to-Point Protocol (PPP) session including a PPP connection, wherein the PPP session is associated with a default time period for maintaining the PPP session during communication inactivity;
means for sending an indicator to configure an extended time period for maintaining the PPP session, wherein the extended time period is greater than the default time period for maintaining the PPP session, wherein the PPP session is associated with the extended time period for maintaining the PPP session during communication inactivity intervals greater than the default time period and less than the extended time period after sending the indicator; and
means for communicating, after sending the indicator and without re-establishing the PPP session, over the PPP connection after a communication inactivity interval greater than the default time period and less than the extended time period based at least in part on sending the indicator to configure the extended time period.

15. The access terminal of claim 14, wherein the indicator comprises an implicit indicator.

16. The access terminal of claim 14, wherein the indicator comprises an explicit indicator.

17. The access terminal of claim 14, wherein the indicator comprises an always-on indicator.

18. The access terminal of claim 14, further comprising:
means for entering a low powered state; and
means for skipping transmission of a power-down registration during the extended time period.

19. The access terminal of claim 14, further comprising:
means for negotiating a duration for the extended time period.

20. A non-transitory computer-readable storage medium, comprising programming for causing a computer to:
establish a Point-to-Point Protocol (PPP) session including a PPP connection, wherein the PPP session is associated with a default time period to maintain the PPP session during communication inactivity;
transmit an indicator to configure an extended time period for maintaining the PPP session, wherein the extended time period is substantially greater than the default time period for maintaining the PPP session, wherein the PPP session is associated with the extended time period for maintaining the PPP session during communication inactivity intervals greater than the default time period and less than the extended time period after sending the indicator; and
communicate, after the indicator is transmitted and without re-establishing the PPP session, over the PPP connection after a communication inactivity interval greater than the default time period and less than the extended time period based at least in part on transmitting the indicator to configure the extended time period.

21. The computer-readable storage medium of claim 20, wherein the indicator comprises an implicit indicator or an explicit indicator.

22. The computer-readable storage medium of claim 20, further comprising programming for causing a computer to:
enter a low powered state; and
skip transmission of a power-down registration during the extended time period.

23. The computer-readable storage medium of claim 20, further comprising programming for causing a computer to:
negotiate a duration for the extended time period.

24. A network entity, comprising:
a communications interface;
a storage medium; and
a processing circuit coupled to the communications interface and the storage medium, the processing circuit adapted to:
receive, via the communications interface, an indicator adapted to configure an extended time period for maintaining a Point-to-Point Protocol (PPP) session, wherein the extended time period is greater than a default time period for maintaining a PPP session, wherein the PPP session is associated with the extended time period for maintaining the PPP session during communication inactivity intervals greater than the default time period and less than the extended time period after receiving the indicator;
communicate via the communications interface to establish a PPP session maintained by the extended time period; and
maintaining, after receiving the indicator and without re-establishing the PPP session, the PPP session during communication inactivity intervals greater than the default time period and less than the extended time period based at least in part on receiving the indicator to configure the extended time period.

25. The network entity of claim 24, wherein the indicator comprises an implicit indicator.

26. The network entity of claim 24, wherein the indicator comprises an explicit indicator.

27. The network entity of claim 24, wherein the indicator comprises an always-on indicator.

28. The network entity of claim 24, wherein the processing circuit is further adapted to:
receive via the communications interface a power-down registration message from an access terminal associated with the established PPP session, wherein the power-down registration message is received during the extended time period; and
ignore the received power-down registration message with respect to the PPP session.

29. The network entity of claim 24, wherein the processing circuit is further adapted to:
negotiate a duration of the extended time period.

30. A method operational on a network entity, comprising:
receiving an indicator adapted to configure an extended time period for maintaining a Point-to-Point Protocol (PPP) session, wherein the extended time period is greater than a default time period for maintaining a PPP session, wherein the PPP session is associated with the extended time period for maintaining the PPP session during communication inactivity intervals greater than the default time period and less than the extended time period after receiving the indicator;
establishing a PPP session including a PPP connection maintained according to the extended time period; and
maintaining, after receiving the indicator and without re-establishing the PPP session, the PPP session during communication inactivity intervals greater than the default time period and less than the extended time period based at least in part on receiving the indicator to configure the extended time period.

31. The method of claim 30, wherein receiving the indicator comprises:
receiving the indicator prior to establishing the PPP session.

32. The method of claim 30, wherein receiving the indicator comprises:
receiving the indicator during the establishment of the PPP session.

33. The method of claim 30, wherein receiving the indicator comprises:
receiving an explicit indicator.

34. The method of claim 30, wherein receiving the indicator comprises:
receiving an implicit indicator.

35. The method of claim 30, further comprising:
receiving a power-down registration message from an access terminal associated with the established PPP session, wherein the power-down registration message is received during the extended time period; and
ignoring the received power-down registration as applied to the PPP session.

36. The method of claim 30, further comprising:
negotiating a duration for the extended time period.

37. A network entity, comprising:
means for receiving an indicator adapted to configure an extended time period for maintaining a Point-to-Point Protocol (PPP) session, wherein the extended time period is greater than a default time period for maintaining a PPP session, wherein the PPP session is associated with the extended time period for maintaining the PPP session during communication inactivity intervals greater than the default time period and less than the extended time period after receiving the indicator;
means for establishing a PPP session including a PPP connection maintained according to the extended time period; and
means for maintaining, after receiving the indicator and without re-establishing the PPP session, the PPP session during communication inactivity intervals greater than the default time period and less than the extended time period based at least in part on receiving the indicator to configure the extended time period.

38. The network entity of claim 37, wherein the indicator comprises an implicit indicator.

39. The network entity of claim 37, wherein the indicator comprises an explicit indicator.

40. The network entity of claim 37, wherein the indicator comprises an always-on indicator.

41. The network entity of claim 37, further comprising:
means for receiving a power-down registration message from an access terminal associated with the established PPP session, wherein the power-down registration message is received during the extended time period; and
means for ignoring the received power-down registration in relation to the PPP session.

42. The network entity of claim 37, further comprising:
means for negotiating a duration for the extended time period.

43. A non-transitory computer-readable storage medium, comprising programming for causing a computer to:
receive an indicator adapted to configure an extended time period for maintaining a Point-to-Point Protocol (PPP) session, wherein the extended time period is greater than a default time period for maintaining a PPP session, wherein the PPP session is associated with the extended time period for maintaining the PPP session during communication inactivity intervals greater than the default time period and less than the extended time period after receiving the indicator;
establish a PPP session including a PPP connection maintained according to the extended time period; and
maintaining, after receiving the indicator and without re-establishing the PPP session, the PPP session during communication inactivity intervals greater than the default time period and less than the extended time period based at least in part on receiving the indicator to configure the extended time period.

44. The computer-readable storage medium of claim 43, wherein the indicator comprises an implicit indicator or an explicit indicator.

45. The computer-readable storage medium of claim 43, further comprising programming for causing a computer to:
receive a power-down registration message from an access terminal associated with the established PPP session, wherein the power-down registration message is received during the extended time period; and
ignore the received power-down registration as applied to the PPP session.

46. The computer-readable storage medium of claim 43, further comprising programming for causing a computer to:
negotiate a duration for the extended time period.

47. An access terminal, comprising:
a communications interface;

a storage medium; and a processing circuit coupled to the communications interface and the storage medium, the processing circuit adapted to:

communicate via the communications interface to establish a Point-to-Point Protocol (PPP) session maintained by an extended time period configured in response to an indicator, where the extended time period is greater than a default time period for maintaining the PPP session during communication inactivity intervals greater than the default time period and less than the extended time period, while the PPP session is maintained during the inactivity intervals greater than the default time period and less than the extended time period; and refrain from transmitting a power-down registration during the extended time period.

48. The access terminal of claim 47, wherein the processing circuit is adapted to:

send via the communications interface an indicator to cause setting the extended time period for maintaining the PPP session.

49. The access terminal of claim 48, wherein the indicator comprises an implicit indicator.

50. The access terminal of claim 48, wherein the indicator comprises an explicit indicator.

51. The access terminal of claim 48, wherein the indicator comprises an always-on indicator.

52. The access terminal of claim 47, wherein the processing circuit is further adapted to:

negotiate a duration of the extended time period.

\* \* \* \* \*